No. 760,680. PATENTED MAY 24, 1904.
C. H. BURTON.
PNEUMATIC CARRIER.
APPLICATION FILED NOV. 14, 1903.
NO MODEL. 2 SHEETS—SHEET 1.
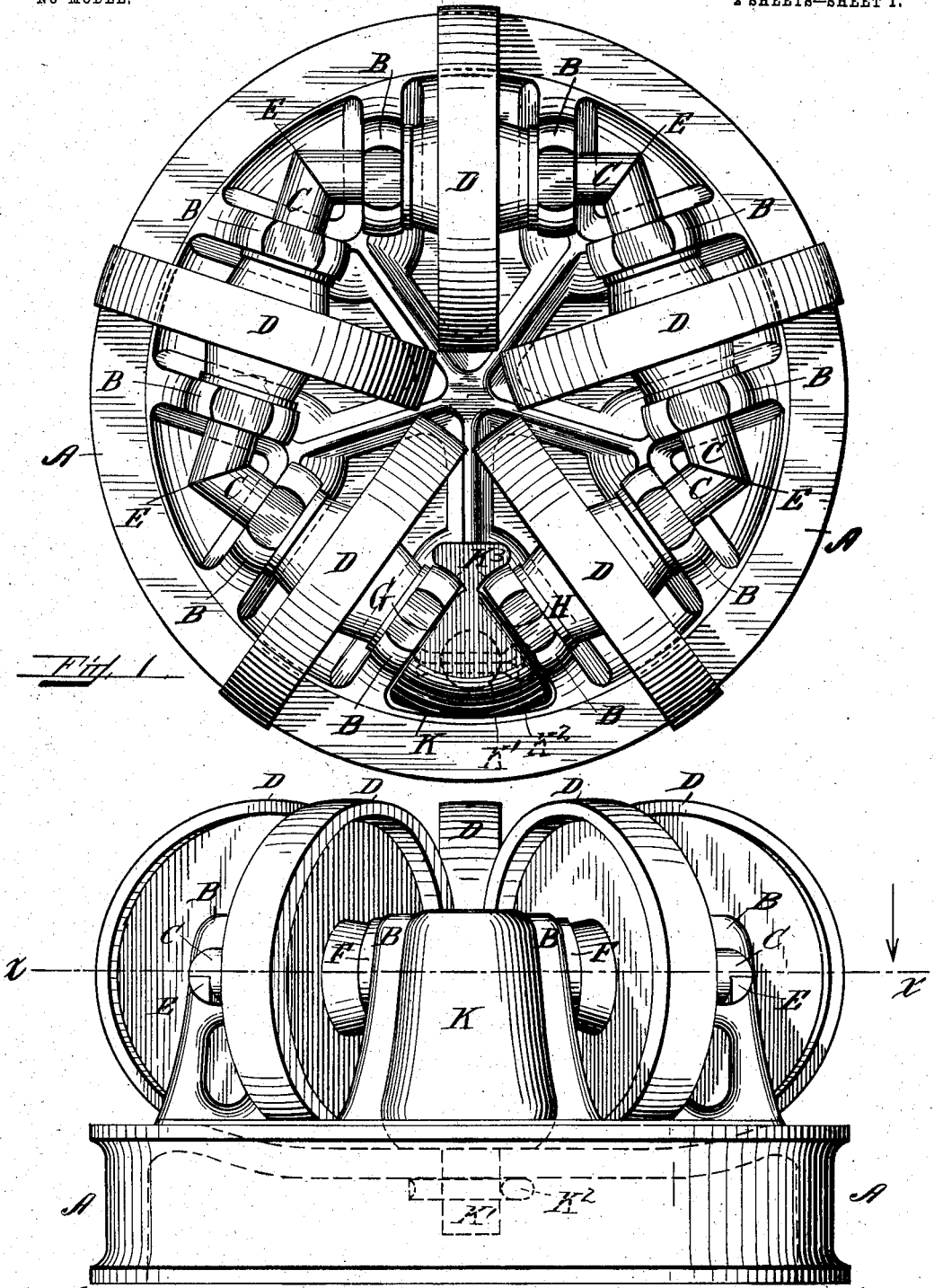

No. 760,680. PATENTED MAY 24, 1904.
C. H. BURTON.
PNEUMATIC CARRIER.
APPLICATION FILED NOV. 14, 1903.
NO MODEL. 2 SHEETS—SHEET 2.

Witnesses: Inventor:
Charles H. Burton

No. 760,680.

Patented May 24, 1904.

UNITED STATES PATENT OFFICE.

CHARLES H. BURTON, OF BOSTON, MASSACHUSETTS, ASSIGNOR TO AMERICAN PNEUMATIC SERVICE COMPANY, OF DOVER, DELAWARE, A CORPORATION OF DELAWARE.

PNEUMATIC CARRIER.

SPECIFICATION forming part of Letters Patent No. 760,680, dated May 24, 1904.

Application filed November 14, 1903. Serial No. 181,141. (No model.)

*To all whom it may concern:*

Be it known that I, CHARLES H. BURTON, of Boston, in the county of Suffolk and State of Massachusetts, have invented certain new and useful Improvements in Pneumatic Carriers, of which the following is a specification.

My invention relates to carriers for pneumatic-despatch tubes, and especially to the type of carriers shown in Letters Patent issued to me April 21, 1903, No. 726,022.

My invention consists of certain novel features hereinafter described, and particularly pointed out in the claims.

Figure 3:
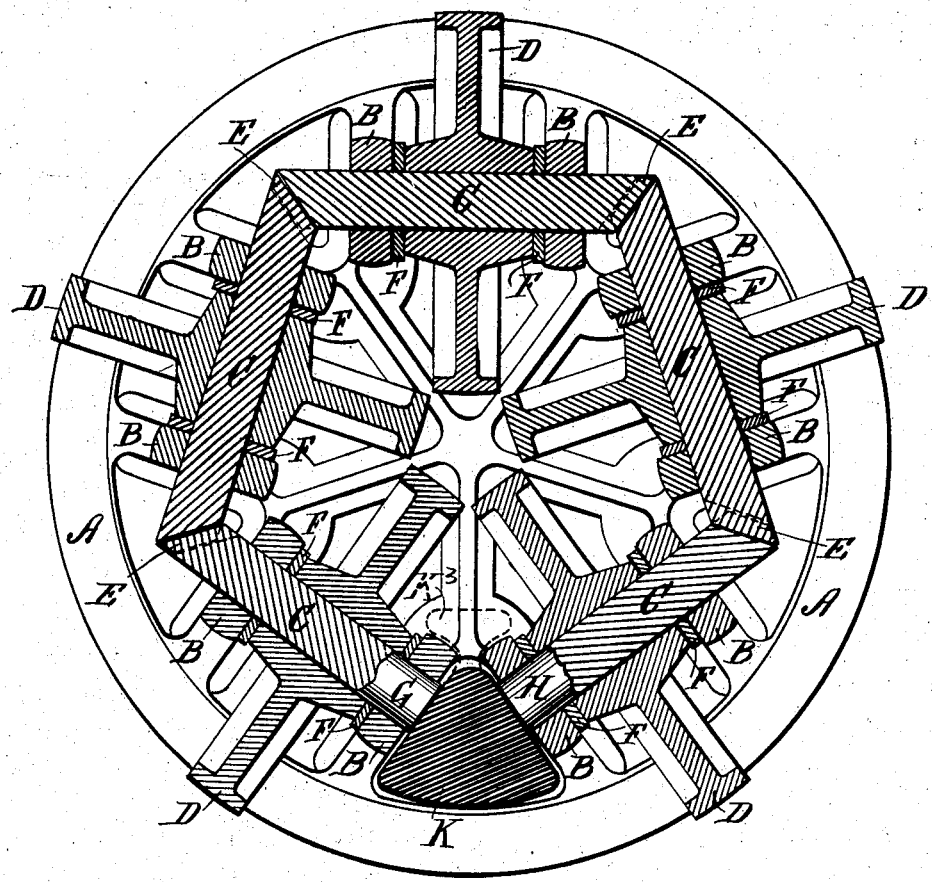
Figure 4:
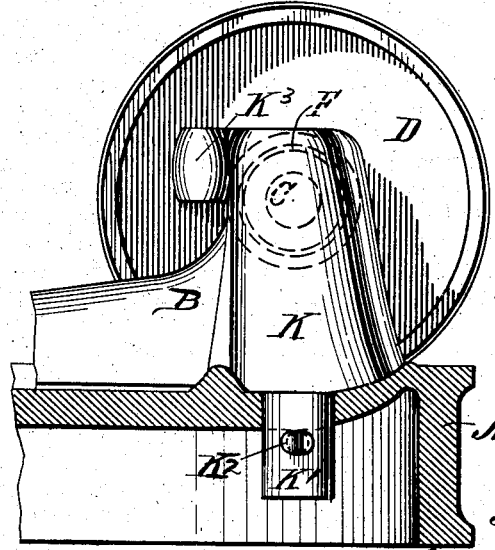

In the accompanying drawings, which illustrate a construction embodying my invention, Figure 1 is an end view of one end of the carrier. Fig. 2 is a side view of one end of the carrier. Fig. 3 is a cross-sectional view on the line X X, Fig. 2. Fig. 4 is a detail sectional view hereinafter described.

Like letters of reference refer to like parts throughout the several views.

From the head A of the carrier project a number of bearings B, formed with said head, and in said bearings B are located fast the shafts C, on which freely revolve the wheels D. These shafts C are provided with interlocking beveled joint E, which should the joint become loose would prevent the shafts from turning and working out. Suitable washers F are located between the hubs of the wheels and the bearings. Between the ends G and H of two of the shafts C there is located the cast-steel plug K, which is forced down into place between said ends G and H, and its lower end K' is held firmly in place by the pin K². Said plug K has an inner extension K³, which fits down between two adjacent bearings B B, and thereby holds the plug against lateral movement. With the parts in the position described and shown the shafts are securely fastened in place and are prevented from dropping into the line. While I have shown this arrangement on one end of the carrier, yet it will be understood that a similar arrangement is provided on the other end.

Having thus described the nature of my invention and set forth a construction embodying the same, what I claim as new, and desire to secure by Letters Patent of the United States, is—

1. In a carrier adapted for transit in a pneumatic-despatch tube, the combination with the body of the carrier of a series of supporting-wheels mounted thereon and at each end, axle-shafts for said wheels, bearings for said shafts, and a device between the ends of two adjacent shafts for holding said shafts in position.

2. In a carrier adapted for transit in a pneumatic-despatch tube, the combination with the body of the carrier of a series of supporting-wheels mounted thereon and at each end, axle-shafts for said wheels, bearings for said shafts, an interlocking joint between said shafts, and a device between the ends of two adjacent shafts for holding said shafts in position.

3. In a carrier adapted for transit in a pneumatic-despatch tube, the combination with the body of the carrier of a series of supporting-wheels mounted thereon and at each end, axle-shafts for said wheels, bearings for said shafts, a device between the ends of two adjacent shafts for holding said shafts in position, and means for locking said device to the body of the carrier to hold it in position.

4. In a carrier adapted for transit in a pneumatic-despatch tube, the combination with the body of the carrier of a series of supporting-wheels mounted thereon and at each end, axle-shafts for said wheels, bearings for said shafts, a device between the ends of two adjacent shafts for holding said shafts in position, and means for preventing the lateral movement of said device.

5. In a carrier adapted for transit in a pneumatic-despatch tube, the combination with the body of the carrier of a series of supporting-wheels mounted thereon and at each end, axle-shafts for said wheels, bearings for said shafts, a device between the ends of two adjacent shafts for holding said shafts in position, means for locking said device to the body of the carrier to hold it in position, and means for preventing the lateral movement of said device.

6. In a carrier adapted for transit in a pneumatic-despatch tube, the combination with the body of the carrier of a series of supporting-wheels mounted thereon and at each end, axle-shafts for said wheels, bearings for said shafts, a plug between the ends of two adjacent shafts for holding said shafts in position and provided with an extension for preventing its lateral movement, and a pin engaging the lower end of said plug for holding it against longitudinal movement.

In testimony whereof I have signed my name to this specification, in the presence of two subscribing witnesses, this 12th day of November, A. D. 1903.

CHARLES H. BURTON.

Witnesses:
 A. L. MESSER,
 A. R. LARRABEE.